E. E. NEAL.
BALL GAGING MACHINE.
APPLICATION FILED SEPT. 30, 1918.

1,335,522.

Patented Mar. 30, 1920.
3 SHEETS—SHEET 1.

INVENTOR
E. E. Neal
BY Lewis O. Hutchinson
ATTORNEYS.

E. E. NEAL.
BALL GAGING MACHINE.
APPLICATION FILED SEPT. 30, 1918.
1,335,522.
Patented Mar. 30, 1920.
3 SHEETS—SHEET 2.
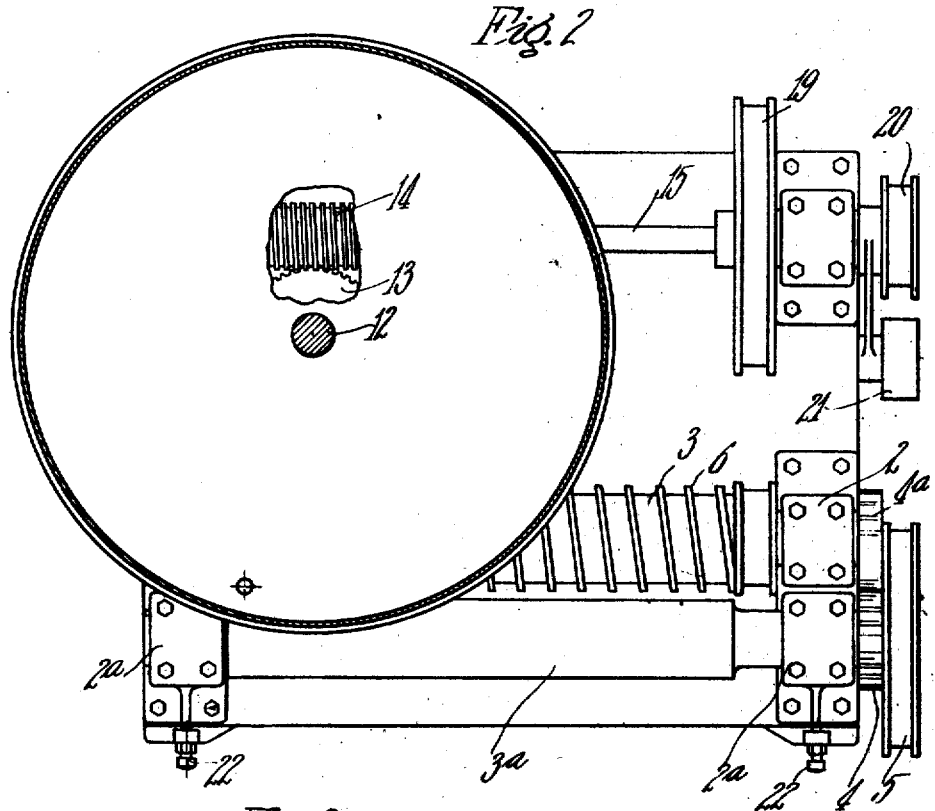
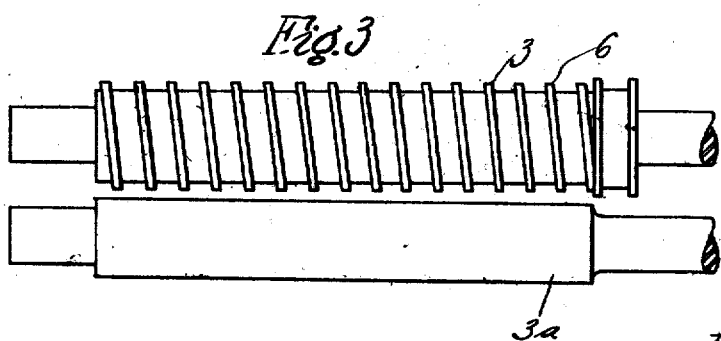
INVENTOR.
E. E. Neal.
BY Lewis O. Hutchinson
ATTORNEYS.

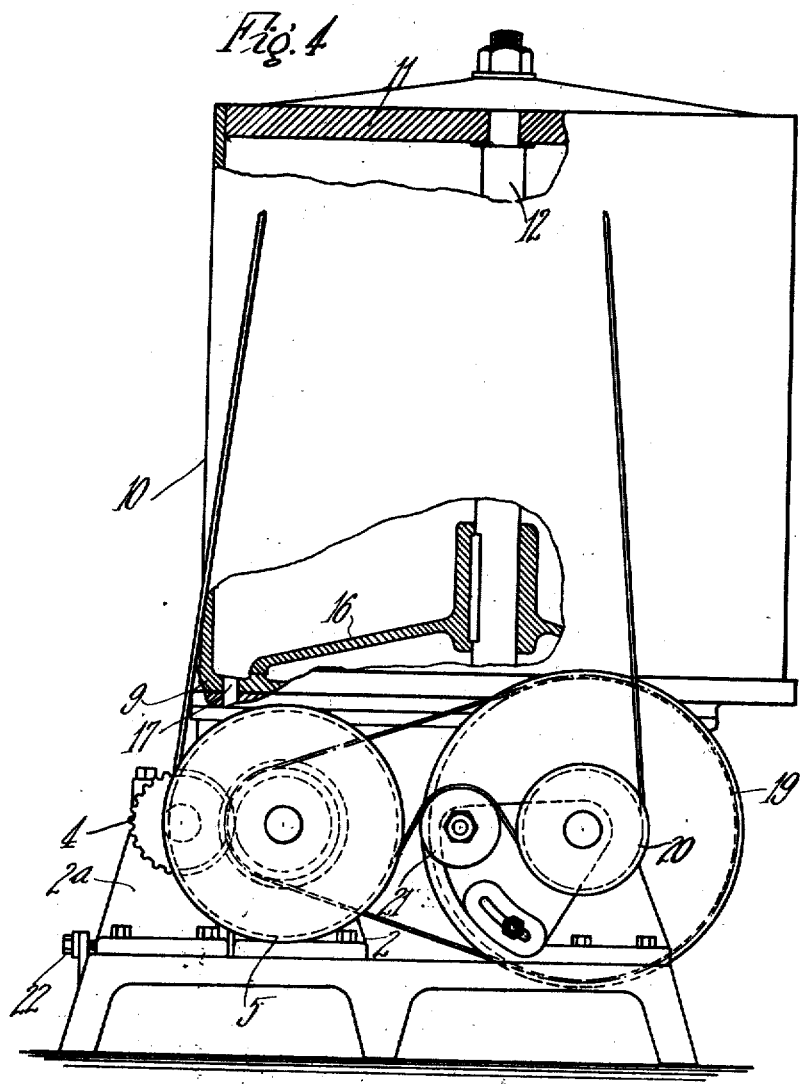

UNITED STATES PATENT OFFICE.

ELMER E. NEAL, OF NEW HAVEN, CONNECTICUT, ASSIGNOR TO MARLIN-ROCKWELL CORPORATION, OF NEW YORK, N. Y., A CORPORATION OF NEW YORK.

BALL-GAGING MACHINE.

1,335,522.  Specification of Letters Patent.  Patented Mar. 30, 1920.

Application filed September 30, 1918. Serial No. 256,308.

*To all whom it may concern:*

Be it known that I, ELMER E. NEAL, a citizen of the United States, residing at New Haven, county of New Haven, State of Connecticut, have invented certain new and useful Improvements in Ball-Gaging Machines, of which the following is a clear, full, and exact description.

My invention relates to a machine for gaging and separating balls of different sizes, particularly those spherical steel balls manufactured for use in ball bearings for which purpose it is necessary to have balls of exactly the same size. It is well known that all the balls coming from the same grinding machine are not exactly of the same size although they vary but slightly and the differences usually measure by the tenths of thousandths of an inch.

The machine disclosed in this application is of the general class in which the balls are caused to travel along an expanding slot and through which the balls will drop into a bin or the like upon reaching a width corresponding to their diameter. As a usual thing, in machines of this character, the slotted track along which the balls roll has been arranged at an incline so that the balls will travel along the slot by gravity, and due to their momentum as they travel along the slot, or to the knocking of a ball by the one behind it, the balls often overrun the point where they should normally drop through. Furthermore, if the defining edges of the slot are adjusted to diverge very gradually so as to obtain fine distinctions between different sizes of balls, the balls will not roll along the same to a point where they will freely fall through but will have a tendency to gradually sink through the slot as they roll along under the force of gravity until they wedge or stick, and thus obstruct other balls coming down the guide and hold up the operation of the machine. For the above reasons the old form of machine must be operated very slowly, and for continuous operation the constant attention of an operator is required. To avoid the tendency of the balls to wedge as they roll down the inclined slot, the sides of the slot were usually brought to a knife edge, which knife edge very quickly deteriorated and lost its straightness under the traveling friction of the balls so that for any accurate gaging frequent replacement or regrinding of these sharp straight edges was necessary.

One object of my invention is to provide a machine for accurately gaging and separating balls according to size and for discriminating between balls differing in diameter by the slightest amount.

A further object of the invention is the provision of rotating members to form a gaging slot along which the elements to be gaged travel and means to feed the elements along said slot, the rotating members and the feeding means being so arranged and operated that they tend to lift the ball slightly as it rolls along the slot until reaching its proper gaging point.

A still further object of my invention is a ball-gaging machine in which the wear on the members constituting the edges of the guiding slot is uniformly distributed over a large area.

Another object of the invention is a ball-gaging machine that can be run efficiently at a high rate of speed for a long period without adjustment.

Other objects of the invention will become apparent as the specification proceeds.

To this end and also to improve generally upon devices of the character indicated, my invention consists in the following matters hereinafter described and claimed.

Fig. 2 is a plan view thereof;

Fig. 3 is a detail view of the rollers showing the tapered slot;

Fig. 4 is an end elevation partly in section.

Figure 1:
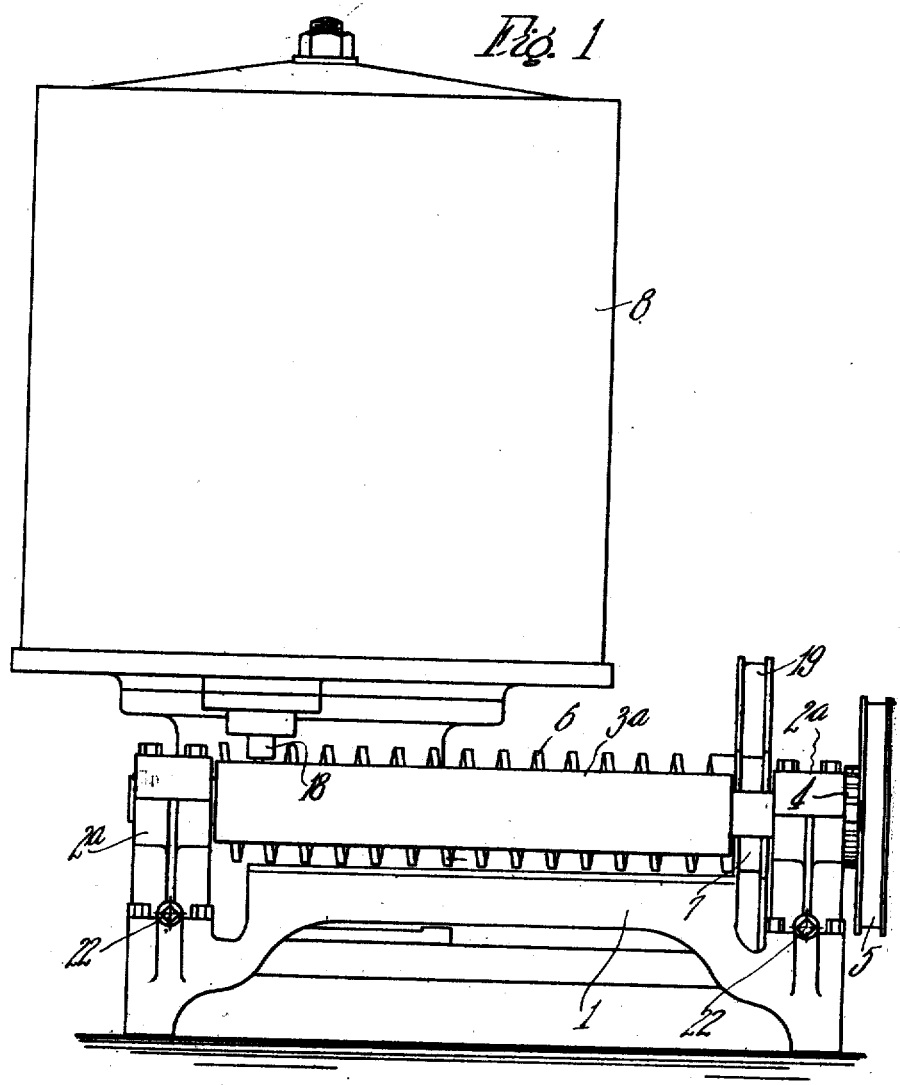
Figure 1 is a side elevation of my device.

Referring more particularly to the drawings, the main frame of the machine is indicated at 1, and journaled in the brackets 2 and 2ᵃ placed at either end of this frame are the cylindrical or frusto-conical rollers 3 and 3ᵃ spaced apart to form a guideway as shown in Figs. 2 and 3. These rollers are preferably disposed so that they define a gaging slot expanding from one end to the other. Any suitable adjusting means may be used to accurately space and hold the rollers 3 and 3ᵃ in position. These rollers are each provided in one end with pinions 4 and 4ᵃ which mesh with each other. One of these rollers is also provided with a pulley 5. Telescoped over one of the rollers 3 is a sleeve 6, which is concentric with said roller and so mounted on the roller that it is capable of rotation independently of the roller. It is also cut through, as shown, forming a continuous open spiral, the open section exposing the gaging roller beneath. This sleeve is provided with a pulley 7 and the spiral acts as a positive feeding means to carry the balls along the gaging slot, and also as a regulator of the speed at which the balls travel. Because of this positive feeding means it is immaterial whether the gaging rollers are inclined or not. The machine will work just as well with the balls traveling horizontally or even up a slight incline as it will with the balls traveling over a slight decline. It is preferable, however, to use the machine with the rollers substantially horizontal.

Located at one end of the machine and above the narrow end of the gaging slot is the hopper 8, into which the balls to be gaged are placed. This hopper consists of a plate 9 and a shell 10. The shell is provided with a spider 11 which acts as a support for the shaft 12. The lower end of the shaft is journaled in the frame 1 and is provided with a worm wheel 13, which is engaged by the worm gear 14, carried by the shaft 15. A false bottom 16 is keyed to the shaft 12. A hole 17 slightly larger in diameter than the balls to be gaged, is provided in the plate 9 directly over the narrow end of the gaging slot and is provided with a feeding tube 18 by means of which the balls are fed onto the rolls. The shaft 15 is provided with a pulley 19 in alinement with the pulley 7 and another pulley 20 in alinement with the pulley 5. A driving belt passes from the driving shaft around the pulley 20 over a tension pulley 21 and thence around the pulley 5. The pulleys 7 and 19 are also connected by a belt.

The brackets 2ª may be provided with openings slightly larger than the bolts which pass through said openings and hold the brackets on to the frame or which will allow suitable connecting means, which will allow of adjustment. By means of this arrangement it is possible to adjust the inclination of the roller 3ª with respect to the roller 3. Set screws 22 are provided to assist in making the adjustment of this roll. The rolls 3 and 3ª rotate in such a way that the adjacent surfaces are traveling upwardly. The sleeve 6 is preferably designed to rotate in the same direction as does the member it surrounds, but may be designed for rotation in the opposite direction. It may rotate at the same as or at a different speed from the roller.

The preferred operation of the device is to so position it that the rollers 3 and 3ª are horizontally arranged and the various pulleys and belts so arranged and designed that the adjacent surfaces of the rollers travel upwardly and the sleeve rotates in the same direction as the roller it surrounds but at a higher rate of speed. The balls are then dropped onto the rollers and are fed along the slot by the sleeve until they reach a point where the width of the slot corresponds to their diameters. Upon reaching this point the balls drop into suitable collecting means.

This machine is very accurate and can be operated at a high rate of speed since the balls are fed along the gaging slot at a uniform speed and spaced from each other and are not subjected to any tendency to wedge between the rolls as these are rotated in a direction tending to lift the ball rather than force it downwardly. The rotation of the sleeve 6 in the same direction as the roller 3 also aids in preventing the wedging of the balls. The relative movement between the roller and the sleeve positively prevents the balls from contacting with the roller in but a single path. The contact is uniformly distributed over the whole surface of the rollers. Because of this fact, the machine will operate efficiently for a long period of time without adjustment.

It is, of course, understood that the particular machine shown and described in the present application illustrates merely a preferred form of construction and arrangement of parts, which, it has been found, will successfully carry out the principles of my invention, and that various changes and modifications of details may be easily made without departing from the spirit of my invention as defined in the appended claims.

I claim as my invention:

1. In a device of the character indicated, in combination, elements presenting a gaging slot having diverging sides along which the members to be gaged travel, rotary means for feeding said members along said slot surrounding one of said elements, and means for rotating said feeding means relative to the element surrounded thereby.

2. In a device of the character indicated, in combination, elements presenting a gaging slot having gradually-diverging sides along which the members to be gaged travel, means for feeding said members along said slot comprising a spiral sleeve surrounding one of said elements, and means to rotate said sleeve relative to the element surrounded thereby.

3. In a device of the character indicated, in combination, rotary elements presenting a gaging slot having gradually-diverging sides along which the members to be gaged travel, rotary means for feeding said members, in spaced relation, along said slot, and means for rotating said rotary means relative to one of said rotary elements.

4. In a device of the character indicated, in combination, rotary elements presenting a gaging slot having gradually-diverging sides along which the members to be gaged travel, means for feeding said members along said slot comprising a spiral sleeve surrounding one of said elements, and means to rotate said sleeve relative to the element surrounded thereby.

5. In a device of the character indicated, in combination, rotary elements presenting a gaging slot having gradually-diverging sides along which the members to be gaged travel, means for feeding said members along said slot comprising a spiral sleeve surrounding one of said elements and means to rotate said sleeve at a higher speed than the element surrounded thereby.

6. In a device of the character indicated, in combination, rotary elements presenting a gaging slot having gradually-diverging sides along which the members to be gaged travel, means for feeding said members along said slot comprising a spiral sleeve surrounding one of said elements, means to rotate said elements, and means to rotate said sleeve relative to the element surrounded thereby.

7. In a device of the character indicated, in combination, rotary elements presenting a gaging slot having gradually-diverging sides along which the members to be gaged travel, means to vary the divergence of said elements, means to feed the said members along said slot comprising a spiral sleeve surrounding one of said elements, means to rotate said elements, and means to rotate said sleeve relative to the element surrounded thereby.

8. In a device of the character indicated in combination, rotary elements presenting a gaging slot having gradually-diverging sides along which the members to be gaged travel, means for feeding said members along said slot comprising a spiral sleeve surrounding one of said elements, means to rotate said elements, and means to rotate said sleeve in the same direction as, but at a different speed than, the element surrounded thereby.

9. In a device of the character indicated in combination, rotary elements presenting a gaging slot having gradually-diverging sides along which the members to be gaged travel, means for feeding said members along said slot comprising a spiral sleeve surrounding one of said elements, means to rotate said elements, and means to rotate said sleeve in the same direction as, but at a higher speed than, the element surrounded thereby.

10. In a device of the character described, a pair of rollers having their axes in the same plane and their adjacent elements forming a gaging slot along which the articles to be gaged are adapted to travel, a spiral sleeve rotatably mounted on one of said rollers, and means to rotate the rollers and the sleeve independently of each other.

11. In a device of the character described, a pair of rollers, the adjacent elements of which define a gaging slot along which the articles to be gaged are adapted to travel, means to vary the positions of the rollers relative to each other, a spiral sleeve rotatably mounted on one of said rollers and means to rotate the rollers and the sleeve independently of each other.

12. In a device of the character indicated, in combination, rotary elements presenting a gaging slot having gradually-diverging sides along which the members to be gaged travel, means for feeding said members along said slot comprising a spiral sleeve surrounding one of the elements, means to rotate said elements and said sleeve relative to the element surrounded thereby in a direction whereby a lifting effect is continually exerted upon said members in their travel along said slot until their arrival at the gage points of said slot accurately corresponding to their respective diameters.

13. In a device of the character indicated, in combination, rotary elements presenting a gaging slot having gradually-diverging sides along which the members to be gaged travel, means for feeding said members along said slot comprising a spiral sleeve surrounding one of the elements, means to rotate said elements and said sleeve at a higher rate of speed than the element surrounded thereby in a direction whereby a lifting effect is continually exerted upon said members in their travel along said slot until their arrival at the gage points of said slot accurately corresponding to their respective diameters.

ELMER E. NEAL.